Patented Jan. 24, 1933

1,895,379

UNITED STATES PATENT OFFICE

VICTOR DUDICK, OF NORTH BELLE VERNON, PENNSYLVANIA, ASSIGNOR OF ONE-THIRD TO JOHN E. COUGHENOUR AND ONE-THIRD TO LOUIS J. VEZZANI, OF NORTH BELLE VERNON, PENNSYLVANIA

DYNAMO ELECTRIC MACHINE AND SYSTEM OF CONTROL THEREFOR

Application filed March 11, 1931, Serial No. 521,788. Renewed July 18, 1932.

This invention relates to a dynamo electric machine and system control therefor and is particularly designed for use in connection with hoists, elevators, street car service and in other locations where quick and accurate stopping of the motor is desirable.

An object of the invention is to provide a dynamo machine equipped with the usual operating windings and also with a separate brake winding located on the rotor of the machine and designed to be connected to the line circuit to operate as a braking winding in bringing the motor and its connected load to a stop and also to hold the rotor stationary in a manner similar to the usual mechanical or electro-mechanical brake.

A further object is to provide a control for the machine including a controller provided with contacts for starting the motor in either direction and connecting the braking windings in circuit when the reversing connections are in off position. It is also an object to employ the special brake winding in conjunction with a dynamic brake winding such as is already known in the art. The operation of the two braking systems is very effective to slow down and stop the motor, and while the dynamic braking circuit ceases to operate at a standstill the separate braking winding remains energized from the line and serves to hold the rotor in its stop position in a manner similar to that of a mechanical brake.

Referring to the drawings, which are made a part of this application and in which similar reference characters indicate similar parts:

Figure 1:
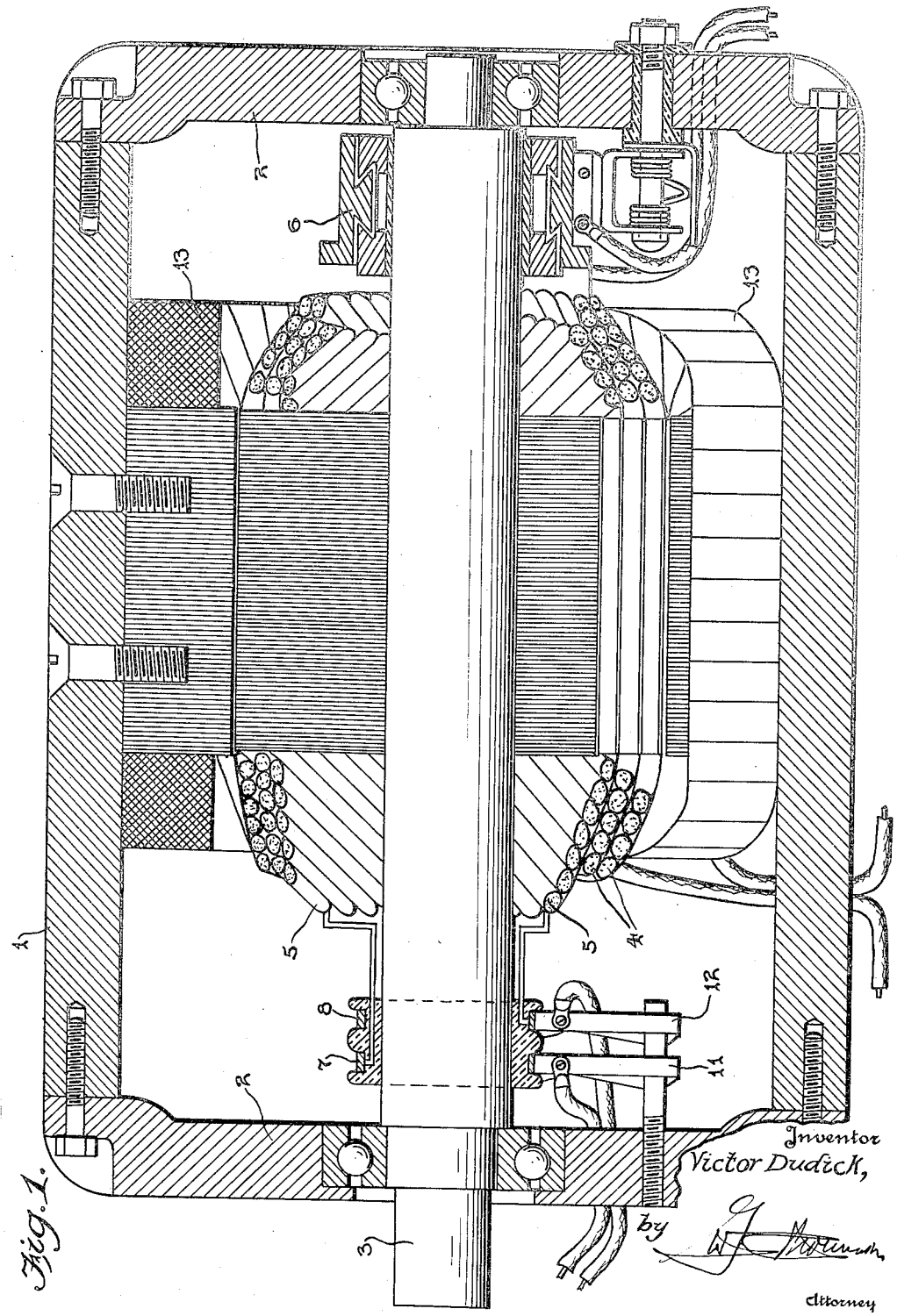
Fig. 1 shows a vertical longitudinal section through the axis of the machine.

The machine disclosed in Fig. 1 is a direct current four-pole motor provided with a commutator and any conventional form of armature winding. This figure also discloses the location of the braking winding which is connected to slip-rings as indicated. The armature winding is illustrated as a simple wave winding as indicated in the lower portion of Fig. 2 and the braking winding is conventionally shown in the upper portion of Fig. 2. In assembling the windings on the rotor the braking windings are placed usually in the bottom of the slots of the rotor and the working windings are placed on top of the braking windings and nearer the surface of the rotor.

Referring particularly to Fig. 1 the motor field frame is indicated at 1 and the end plates at 2. The shaft 3 is mounted on bearings in the end plates and carries the usual rotor laminations in which the armature windings 4 are placed over the braking windings 5 which are located in the bottom of the slots. The working armature windings 4 are connected to the commutator and the braking winding is connected to the slip rings 7 and 8. The commutator is provided with the usual brushes 9, 10 and the slip rings with brushes 11, 12. The machine as illustrated is a four-pole machine having field coils 13 although obviously the invention is not limited to a four-pole machine but may be applied to a motor of any desired number of poles. Likewise while a simple wave winding for the armature is illustrated the invention is not limited to a machine having this particular type of winding as it may readily be applied to machines having any usual form of armature winding. Likewise, while a simple shunt wound motor is illustrated, the invention is not limited to a machine of that type. It can be used with series wound and compound wound motors. The illustration shows a lap winding as a form of braking winding but the invention is not limited to that type of braking winding as any form of winding giving the proper polarity on the armature to produce the braking and locking effect will serve the purpose.

Figure 3:
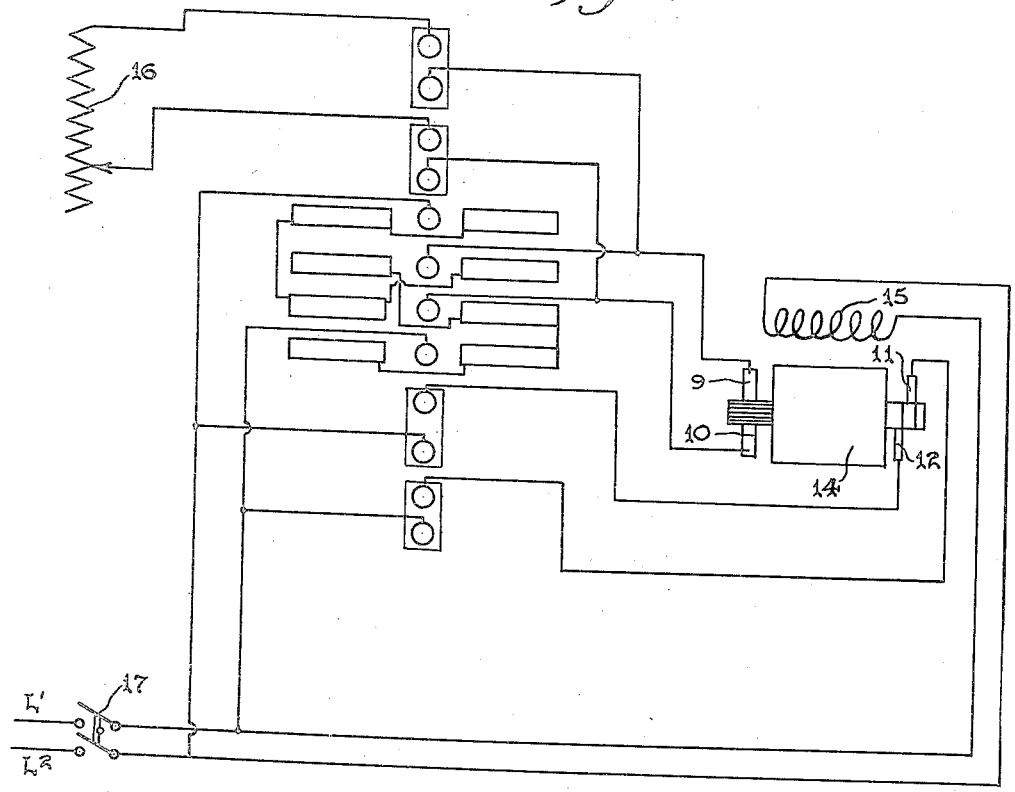
Fig. 3 is a diagrammatic showing of the control system.

The control system for the motor is illustrated diagrammatically in Fig. 3 in which figure the armature 14 is shown connected to the line circuit L1, L2 through a reversing controller having extra contacts controlling the braking circuits. While the illustration shows a drum type of controller, it is not limited to that type of control as any type of automatic controlled switch board, master controller or push button can be used. The machine as shown is provided with a shunt field winding 15 although additional series windings may be employed if found desirable. In the position of the controller indicated in Fig. 3 the armature of the motor is shown as short circuited on the dynamic braking resistance 16 through the four upper contacts of the controller and the braking winding which is connected to brushes 11 and 12 is energized from the line through the four lower contacts of the controller. The four central contacts of the controller in connection with the movable contacts thereof operate as reversing contact for controlling the direction of rotation of the armature and as illustrated in Fig. 3 are in inoperative or off position.

The operation of the control system is as follows:

The line switch 17, or any magnetic contactor or contactors which can be controlled from any convenient location near the drum or master controller by a push button, is closed and the controller moved to the left, or to the right, depending upon the direction of rotation of the armature desired whereupon the machine will start to rotate. Any usual accelerating resistance may be employed for controlling the acceleration of the motor to full speed and it is not considered necessary to illustrate such devices in view of their common use in the art. In stopping the motor and applying the braking means the controller is moved to neutral position as illustrated in Fig. 3 in which position the armature is disconnected from the line circuit and short-circuited through the resistance 16 and at the same time the braking winding is connected directly to the line and operates in conjunction with the dynamic braking circuit to bring the motor to a standstill. It will be noted of course that the shunt field winding 15 is constantly connected directly to the line circuit in case of a shunt motor. When used in connection with a plain series wound motor, it is necessary to incorporate a shunt field winding within the motor field frame, making practically a compound wound motor and using the series field winding with the armature working winding 4 for driving service while the shunt field winding with the armature braking winding 5 are disconnected from the line and are rendered inoperative. When the controller is placed in off position, the shunt field winding and the armature braking winding 5 are connected to the line and are placed into operation for braking and locking effect at which time the series field winding and the armature working windings are disconnected from the line and suitably connected across the dynamic resistance 16 for dynamic braking effect. With a compound wound motor the regular shunt field winding already incorporated in the motor can be used for field excitation for both working and braking effects. The series field winding of a compound wound motor and armature working winding when disconnected from line are suitably connected across the dynamic resistance 16 to produce dynamic braking effect. The operation of the dynamic braking circuit is similar to that of similar circuits in the art but the braking winding located on the armature sets up a magnetic field which cooperates with the field magnet arrangement in a manner to quickly and powerfully apply a braking force to the armature to bring it to a stop and since the braking winding is connected directly to the line it is energized so long as the controller is in the braking position and the field set up thereby will so magnetize the armature in cooperation with the field magnetism as to hold the armature in the position in which it comes to a standstill. If the controller is thrown in an opposite direction to reverse the motor the starting operation is the same and when the controller is brought to neutral position and braking circuits operate in the same manner as that just described.

Figure 2:
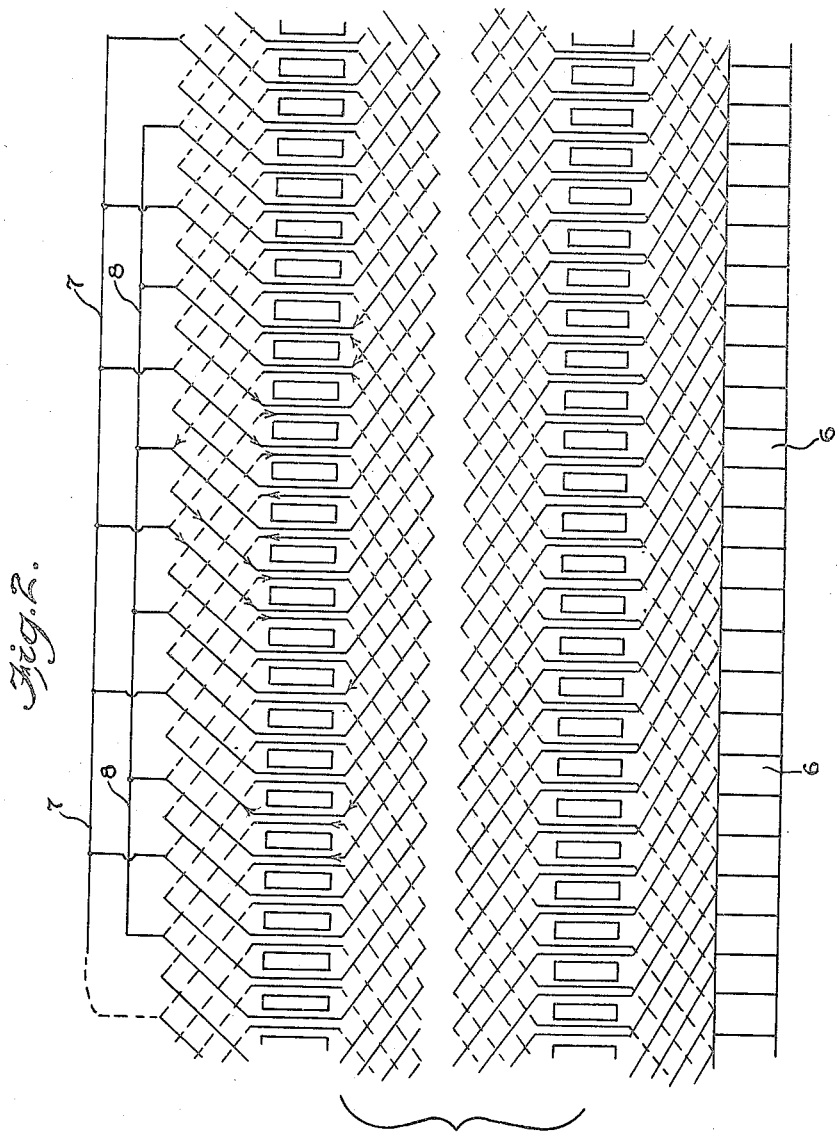
Fig. 2 is a conventional showing of the braking winding and the working winding of the rotor of the machine.
Figure 4:
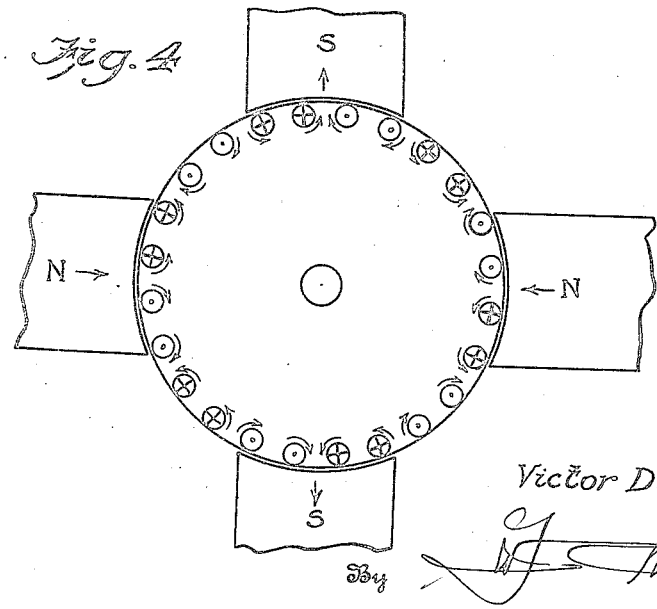
Fig. 4 is a conventional showing of the arrangement of the braking windings relative to the pole pieces of a four-pole machine.

In Fig. 4 there is illustrated in a conventional manner the relationship between the braking winding which is shown mounted in a core structure and the pole pieces of a four-pole machine. This figure does not illustrate the exact arrangement of the braking windings as indicated in Figs. 1 and 2 but is employed to illustrate the magnetic effect of the turns of the braking winding in cooperation with the respective pole pieces. In this figure twenty-four turns are shown on the armature, four of which are located under each of the respective pole faces. Considering the pole faces it will be noted that the direction of current through the braking windings is such as to direct the flux produced in such winding into the face of the south poles and out of the face of the north poles thereby in effect producing a polarized condition of the armature with respect to the field poles to lock the armature in any position in which the same may be brought to a standstill. In the actual machine the braking windings are located in the bottom of the slots of the rotor and equally distributed around the same and the working armature windings are placed thereon as has been pointed out above.

The braking winding should of course be designed to have a sufficient resistance to withstand the full line voltage at standstill without over-heating and at the same time provide sufficient flux for cooperating with that of the field winding to produce the desired braking effect for stopping the machine and holding the same when under load as in hoisting operations.

Having thus fully described my said invention, what I claim as new and desire to secure by Letters Patent, is:

1. In a control system, the combination with an electric motor, a supply circuit therefor, a controller for determining the direction of motor rotation, said motor having a constantly energized field winding and having on its rotor a separate polarizing braking winding independent of the motor winding, and means on said controller for connecting said braking winding to the supply circuit when said controller is in off position.

2. In a control system, in combination a separately excited direct current motor having a polarizing braking winding mounted on its rotor, a supply circuit, and a controller having contacts for connecting the armature to the supply circuit for running operation and for connecting said braking winding to the supply circuit for braking operation.

3. In a control system, in combination a direct current separately excited motor having a polarizing braking winding on its rotor, a braking resistance, a supply circuit and a controller having forward, reverse and braking positions, said controller in braking position disconnecting the armature from the supply circuit and connecting it across said resistance and connecting said braking winding to the supply circuit.

4. In combination, a supply circuit, a direct current motor having a separately excited field winding connected to said supply circuit, a polarizing braking and holding winding on the armature of said motor, means for disconnecting the supply circuit from the motor armature and connecting the braking and holding winding to the supply circuit for braking the motor and for holding the armature in stop position.

5. In combination, a supply circuit, a direct current motor having a separately excited field winding connected to said supply circuit, a closed braking winding equally distributed around the armature of said motor and connected to slip rings on the armature shaft and a controller for connecting the armature to said supply circuit for motor operation and for connecting said braking winding to said supply circuit for braking and holding the armature in stop position.

6. In combination, a supply circuit, a direct current separately excited motor, a direct current equally distributed polarizing braking winding on the armature of said motor and means for connecting said braking winding to said supply circuit for braking and holding said armature in stop position.

7. In combination, a supply circuit, a direct current separately excited multipolar motor, an equally distributed polarizing braking winding on the armature of said motor and means for connecting said braking winding to said supply circuit for braking said armature and holding the same in stop position.

8. In combination, a supply circuit, a direct current separately excited multipolar motor, a distributed polarizing braking winding mounted on the armature of said motor, a dynamic braking resistance, a reversing controller for said motor provided with means for connecting the supply circuit to the braking winding and the dynamic braking resistance across the armature.

9. The method of braking and holding in stop position a direct current separately excited multipolar motor which consists in establishing a polarized magnetic field in the armature of the motor which in cooperation with the separately excited field flux brakes the armature and holds the same in stop position.

10. The method of braking and holding in stop position a direct current separately excited motor which consists in maintaining the field excitation on stopping and developing in the armature from an external source, a polarized magnetic field for magnetically locking the armature and field poles to brake and hold the armature in stop position.

In testimony whereof I have hereunto set my hand this 27th day of February, 1931.

VICTOR DUDICK.